United States Patent
Yoon et al.

(10) Patent No.: US 10,324,775 B2
(45) Date of Patent: Jun. 18, 2019

(54) METHOD FOR BIDIRECTIONAL CALLING BETWEEN OPEN SYSTEM AND MAINFRAME SYSTEM PERFORMED BY COMPUTING DEVICE

(71) Applicant: TMAXSOFT CO., LTD., Gyeonggi-do (KR)

(72) Inventors: Tae Hyun Yoon, Gyeonggi-do (KR); Sang Yong Park, Gyeonggi-do (KR); Jang Won Han, Seoul (KR); Hwang Wook Kim, Gyeonggi-do (KR); Mi Reu Lim, Gyeonggi-do (KR)

(73) Assignee: TmaxSoft Co., Ltd., Gyeonggi-do (KR)

( * ) Notice: Subject to any disclaimer, the term of this patent is extended or adjusted under 35 U.S.C. 154(b) by 30 days.

(21) Appl. No.: 15/642,065

(22) Filed: Jul. 5, 2017

(65) Prior Publication Data
US 2018/0300188 A1    Oct. 18, 2018

(30) Foreign Application Priority Data

Apr. 17, 2017    (KR) ........................ 10-2017-0049156

(51) Int. Cl.
*G06F 9/44*   (2018.01)
*G06F 9/54*   (2006.01)

(52) U.S. Cl.
CPC .............. *G06F 9/546* (2013.01); *G06F 9/545* (2013.01)

(58) Field of Classification Search
CPC ....... G06F 9/45533; G06F 9/541; G06F 9/546

USPC ..................................... 718/1; 719/313, 319
See application file for complete search history.

(56) References Cited

U.S. PATENT DOCUMENTS

| | | | |
|---|---|---|---|
| 7,032,228 B1 * | 4/2006 | McGillis | G06F 3/0607 709/217 |
| 8,527,944 B2 * | 9/2013 | Teng | G06F 11/3636 717/110 |
| 8,881,139 B1 | 11/2014 | Acacio | |
| 2013/0132947 A1 | 5/2013 | Falby et al. | |
| 2014/0181702 A1 | 6/2014 | Suissa et al. | |
| 2015/0007142 A1 * | 1/2015 | Biffle | G06F 21/53 717/126 |

\* cited by examiner

*Primary Examiner* — Andy Ho
(74) *Attorney, Agent, or Firm* — Rutan & Tucker, LLP

(57) ABSTRACT

Disclosed is a method for bi-directional calling between an open system module and a mainframe system module, which is performed in a computing device including one or more processors and a main memory storing commands executable in the processors. The method may include: receiving, by a front-end interface, a calling for a mainframe function on the mainframe system module from the open system module program; requesting, by an entrance point processing unit of the front-end interface, information on the mainframe function to a program processing unit of a back-end interface; controlling, by the entrance point processing unit of the front-end interface, a register processing unit of the back-end interface to set a mainframe register value used in the mainframe system module; and transferring, by the front-end interface, a system control to the mainframe system module through a control transfer processing unit of the back-end interface so as to drive the mainframe function on the mainframe system module.

15 Claims, 10 Drawing Sheets

METHOD FOR BIDIRECTIONAL CALLING BETWEEN OPEN SYSTEM AND MAINFRAME SYSTEM PERFORMED BY COMPUTING DEVICE

RELATED APPLICATIONS

This application is related to and claims the benefit under 35 USC § 119 of Korean Application KR 10-2017-0049156 titled "Method for bi-directional calling between open system and mainframe system performed by computing device" filed Apr. 17, 2017, which is incorporated herein by reference in its entirety.

TECHNICAL FIELD

The present disclosure relates to supporting communication of programs in a computing device, and more particularly, to communication between a mainframe system and an open system.

BACKGROUND ART

A virtual machine (VM) acquired by implementing a computing environment as software includes software that emulates a computer. The virtual machine may be generally classified into a system virtual machine and a process virtual machine. The system virtual machine has a structure in which a program is executed on respective independent operating systems (OSs) and the process virtual machine has a structure in which the program is executed on a host operating system. A native program may include the program executed on the operating system.

It is impossible to call the program which operates on the system virtual machine in the native program due to such a structural difference, but in the case of the program which operates on the process virtual machine, when an appropriate interface is provided, it may be possible to call the virtual machine program in the native program.

As a representative example, a Java Native Interface (JNI) which is an interface of a Java virtual machine (JVM) provides a function to call a Java object code executed in the Java virtual machine by a library implemented by native application programs and other languages including C, C++, and Assembly or call a library in which the program of the Java virtual machine is implemented by other languages.

A mainframe virtual machine (MVM) as a program acquired by implementing a mainframe computing environment as the software provides a function to execute a mainframe program in not a mainframe but a computer (for example, an open system (hereinafter, referred to as an open system) such as UNIX, Linux, etc.,).

Since Assembler is a computer programming language corresponding to a machine language one to one, a program prepared by a mainframe assembler may be normally executed without modifying the program only through a mainframe virtual machine environment.

Rehosting reconstructs hardware (H/W) and software (S/W) in a mainframe system environment that processes data of an enterprise in an open system environment and switches data (including DATABASE and a general file) to the open system environment. The rehosting reuses an application program to be implemented at low cost and the open system has an advantage in that maintenance cost is inexpensive as compared with the mainframe system. However, some of the programs executed in the mainframe system need to be used in spite of completing the rehosting, and as a result, there is a demand for a technology that intends to support the mainframe virtual machine by implementing the mainframe virtual machine.

Prior Art Document: U.S. Pat. No. 8,881,139 (Nov. 4, 2014)

SUMMARY OF THE INVENTION

The present disclosure has been made in an effort to support bi-directional calling between a program on a mainframe process virtual machine which operates in an open system and a native program.

An exemplary embodiment of the present disclosure provides a method for bi-directional calling between an open system module and a mainframe system module, which is performed in a computing device including one or more processors and a main memory storing commands executable in the processors. The method may include receiving, by a front-end interface, a calling for a mainframe function on the mainframe system module from the open system module program; requesting, by an entrance point processing unit of the front-end interface, information on the mainframe function to a program processing unit of a back-end interface; controlling, by the entrance point processing unit of the front-end interface, a register processing unit of the back-end interface to set a mainframe register value used in the mainframe system module; and transferring, by the front-end interface, a system control to the mainframe system module through a control transfer processing unit of the back-end interface so as to drive the mainframe function on the mainframe system module.

In the exemplary embodiment, the method may further include setting, by the entrance point processing unit of the front-end interface, a return address after calling the mainframe function in the program processing unit of the back-end interface.

In the exemplary embodiment, the mainframe register value may include a return register value indicating a time when the mainframe function is executed in the mainframe system module and thereafter, returns to the open system module, and a calling function register value indicating an address of the called mainframe function, and a program counter register value indicating the address of the mainframe function which is currently executed.

In the exemplary embodiment, the method may further include returning the system control from the mainframe system module to the open system module when the program counter register value is the same as the return register value.

In the exemplary embodiment, in the returning of the system control from the mainframe system module to the open system module, the back-end interface may be performed by referring to a return address set in the program processing unit of the back-end interface in the entrance point processing unit of the front-end interface.

Another exemplary embodiment of the present disclosure provides a method for bi-directional calling between an open system module and a mainframe system module, which is performed in a computing device including one or more processors and a main memory storing commands executable in the processors. The method may include receiving, by a back-end interface, a calling for an open system module function on the open system module from the mainframe system module; returning, by a program processing unit of a back-end interface, a name of the open system module function to the mainframe system module; transferring, by the mainframe system module, a system control to the open system module through the back-end interface by allowing a control transfer processing unit of the back-end interface to call an entrance point processing unit of a front-end interface corresponding to the name of the open system module function; and calling, by the front-end interface, the open system module function.

In the exemplary embodiment, the back-end interface may map and store the name and an address of the open system module function.

Yet another exemplary embodiment of the present disclosure provides a method for bi-directional parameter transfer between an open system module and a mainframe system module, which is performed in a computing device including one or more processors and a main memory storing commands executable in the processors. The method may include receiving, by a back-end interface, a calling for a mainframe parameter on the mainframe system module from the open system module; acquiring, by a parameter processing unit of a front-end interface, the address of a parameter list stored in a register processing unit of the back-end interface from the register processing unit of the back-end interface; and sequentially acquiring, by the parameter processing unit, parameters of the parameter list from a memory processing unit of the back-end interface by referring to the address of the parameter list.

In the exemplary embodiment, the address of the parameter list may indicate a start address of the parameter on the system memory.

In the exemplary embodiment, the sequentially acquiring of the parameters of the parameter list may be performed until the parameter processing unit discovers a value indicating that the parameter is a last parameter among the parameters of the parameter list.

In the exemplary embodiment, the value indicating that the parameter is the last parameter may be a parameter address value in which a most significant bit or a most significant byte is 1.

Still yet another exemplary embodiment of the present disclosure provides a method for bi-directional parameter transfer between an open system module and a mainframe system module, which is performed in a computing device including one or more processors and a main memory storing commands executable in the processors. The method may include receiving, by a parameter processing unit of a front-end interface, an open system parameter from the open system module; transferring, by the parameter processing unit, information on the open system parameter to a memory processing unit of a back-end interface; changing, by the memory processing unit, the open system parameter to a mainframe parameter by referring to the information on the open system parameter; returning, by the memory processing unit, the information on the mainframe parameter to the parameter processing unit; and transferring, by the parameter processing unit, the information on the mainframe parameter to a register processing unit of the back-end interface so as to store the information on the mainframe parameter in a register.

In the exemplary embodiment, the information on the open system parameter may include the number of open system parameters and the addresses of the respective open system parameters.

In the exemplary embodiment, the changing of the open system parameter to the mainframe parameter may include generating a parameter list storing the addresses of the respective open system parameters and storing the address of the parameter of the open system module in the parameter list in order to follow a parameter call protocol of the mainframe system module.

In the exemplary embodiment, the method may further include setting, by the memory processing unit, a value indicating that the parameter is a last parameter in the address of a last parameter among the parameters included in the parameter list.

A further exemplary embodiment of the present disclosure provides a computing device for supporting a bi-directional calling between an open system module and a mainframe system module. The computing device may include one or more processors; and a memory storing commands executable in the one or more processors, in which the one or more processors include the open system module implemented by a native program in an operating system of the computing device, and a front-end interface including an entrance point processing unit capable of exchanging data with the open system module and a back-end interface, receiving a calling for a mainframe function on the mainframe system module from the open system module, requesting information on the mainframe function to a program processing unit of a back-end interface, controlling a register processing unit of the back-end interface to set a mainframe register value used in the mainframe system module, and transferring a system control to the mainframe system through a control transfer processing unit of the back-end interface so as to drive the mainframe function on the mainframe system module, a back-end interface including a program processing unit providing information on the mainframe function to the entrance point processing unit of the front-end interface, a register processing unit setting a mainframe register value used in the mainframe system module, and a control transfer processing unit transferring the system control to the mainframe system so as to drive the mainframe function called from the open system module on the mainframe system module, and the mainframe system module constituted by a virtual machine in a higher layer of an operating system of the computing device.

Another further exemplary embodiment of the present disclosure provides a computing device for supporting bi-directional calling between an open system module and a mainframe system module. The computing device may include one or more processors; and a memory storing commands executable in the one or more processors, in which the one or more processors include the open system module implemented by a native program in an operating system of the computing device, a back-end interface including a program processing unit returning a name of the open system module function to the mainframe system module so that the mainframe system module calls an open system module function, and a control transfer processing unit transferring a system control to the open system module by calling the entrance point processing unit of a front-end interface corresponding to a name of the open system module function, and the mainframe system module constituted by a virtual machine in a higher layer of an operating system of the computing device.

Yet another further exemplary embodiment of the present disclosure provides a computing device for supporting bi-directional parameter transfer between an open system module and a mainframe system module. The computing device may includes: one or more processors; and a memory storing commands executable in the one or more processors, in which the one or more processors include the open system module implemented by a native program in an operating system of the computing device, and a back-end interface including register processing unit providing an address of a stored parameter list to a parameter processing unit of a front-end interface and receiving a calling for a mainframe parameter on the mainframe system module from the open system module, the front-end interface including a parameter processing unit acquiring the address of the parameter list stored in the register processing unit of the back-end interface from the register processing unit and sequentially acquiring parameters of the parameter list from a memory processing unit of the back-end interface by referring to addresses of the parameter list, and the mainframe system module constituted by a virtual machine in a higher layer of an operating system of the computing device.

Still yet another further exemplary embodiment of the present disclosure provides a computing device for supporting bi-directional parameter transfer between an open system module and a mainframe system module. The computing device may include one or more processors; and a memory storing commands executable in the one or more processors, in which the one or more processors include the open system module implemented by a native program in an operating system of the computing device, a front-end interface including a parameter processing unit receiving an open system parameter from the open system module, transferring information on the open system parameter to a memory processing unit of a back-end interface, and transferring information on a mainframe parameter to a register processing unit of a back-end interface so as to store the information on the mainframe parameter in a register, a back-end interface including the memory processing unit changing the open system parameter to the mainframe parameter by referring to the information on the open system parameter and return the information on the mainframe parameter to the parameter processing unit, and the register processing unit storing the information on the mainframe parameter in the register, and the mainframe system module constituted by a virtual machine in a higher layer of an operating system of the computing device.

Still further exemplary embodiment of the present disclosure provides a computer program stored in a computer readable medium, which includes a plurality of commands executed by one or more processors of a computing device. The computing program may include: a command to receive, by a front-end interface, a calling for a mainframe function on the mainframe system module from the open system module program; a command to request, by an entrance point processing unit of the front-end interface, information on the mainframe function to a program processing unit of a back-end interface; a command to control, by the entrance point processing unit of the front-end interface, a register processing unit of the back-end interface to set a mainframe register value used in the mainframe system module; and a command to transfer, by the front-end interface, a system control to the mainframe system module through a control transfer processing unit of the back-end interface so as to drive the mainframe function on the mainframe system module.

Another still further exemplary embodiment of the present disclosure provides a computer program stored in a computer readable medium, which includes a plurality of commands executed by one or more processors of a computing device. The computing program may include: a command to receive, by a back-end interface, a calling for an open system module function on the open system module from the mainframe system module; a command to return, by a program processing unit of a back-end interface, a name of the open system module function to the mainframe system module; a command to transfer, by the mainframe system module, a system control to the open system module through the back-end interface by allowing a control transfer processing unit of the back-end interface to call an entrance point processing unit of a front-end interface corresponding to the name of the open system module function; and a command to call, by the front-end interface, the open system module function.

Yet another still further exemplary embodiment of the present disclosure provides a computer program stored in a computer readable medium, which includes a plurality of commands executed by one or more processors of a computing device. The computing program may include: a command to receive, by a back-end interface, a calling for a mainframe parameter on a mainframe system module from an open system module; a command to acquire, by a parameter processing unit of a front-end interface, the address of a parameter list stored in a register processing unit of the back-end interface from the register processing unit of the back-end interface; and a command to sequentially acquire, by the parameter processing unit, parameters of the parameter list from a memory processing unit of the back-end interface by referring to the address of the parameter list.

Still yet another still further exemplary embodiment of the present disclosure provides a computer program stored in a computer readable medium, which includes a plurality of commands executed by one or more processors of a computing device. The computing program may include: a command to receive, by a parameter processing unit of a front-end interface, an open system parameter from the open system module; a command to transfer, by the parameter processing unit, information on the open system parameter to a memory processing unit of a back-end interface; a command to change, by the memory processing unit, the open system parameter to a mainframe parameter by referring to the information on the open system parameter; a command to return, by the memory processing unit, the information on the mainframe parameter to the parameter processing unit; and a command to transfer, by the parameter processing unit, the information on the mainframe parameter to a register processing unit of the back-end interface so as to store the information on the mainframe parameter in a register.

According to exemplary embodiments of the present disclosure, it is possible to support bi-directional calling between a program on a mainframe process virtual machine which operates in an open system and a native program.

DETAILED DESCRIPTION

Figure 1:
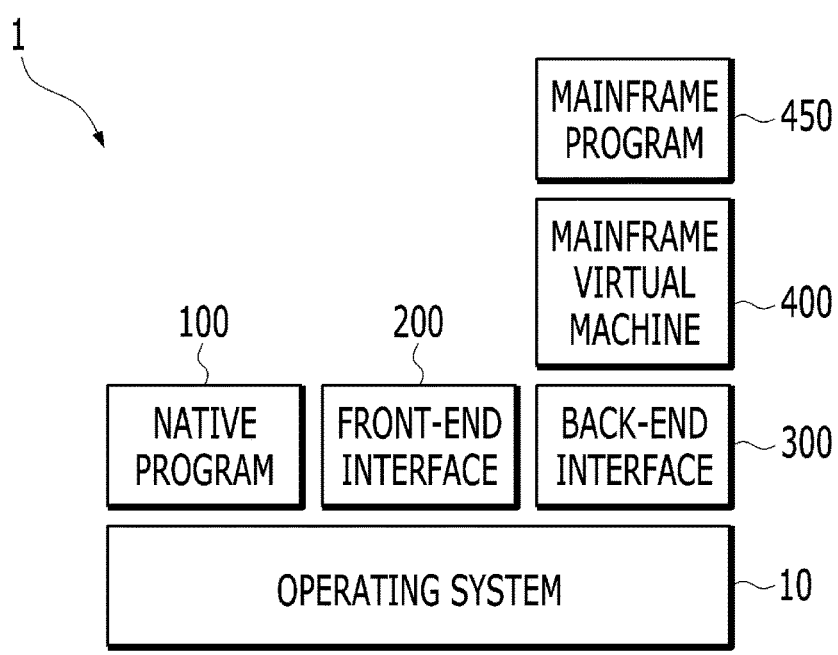
FIG. 1 is a block diagram illustrating an overall configuration of a computing device according to an exemplary embodiment of the present disclosure.

Various exemplary embodiments will be now described with reference to drawings and like reference numerals are used to refer to like elements throughout all drawings. In the present specification, various descriptions are presented to provide appreciation of the present disclosure. However, it is apparent that the exemplary embodiments can be executed without the specific description. In other examples, known structures and apparatuses are presented in a block diagram form in order to facilitate description of the exemplary embodiments.

"Component", "module", "system", and the like which are terms used in the specification designate a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computer device and the computing device may be the components. One or more components may reside in the processor and/or execution thread and one component may be localized in one computer or distributed among two or more computers. Further, the components may be executed by various computer-readable media having various data structures, which are stored therein. The components may perform communication through local and/or remote processing according to a signal (for example, data through other system and a network such as the Internet through data and/or a signal from one component that interacts with other components in a local system and a distribution system) having one or more data packets, for example.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is coherent with the principles and new features presented herein.

FIG. 1 is a block diagram illustrating an overall configuration of a computing device according to an exemplary embodiment of the present disclosure.

The computing device 1 may include an operating system (OS) 10, a native program 100, a front-end interface 200, a back-end interface 300, a mainframe virtual machine 400, and a mainframe program 500.

Respective components of the computing device 1 of the present disclosure may include modules configured by a combination of hardware and software on a computer.

The native program 100 which is a term of the present specification as a module implemented in an open system environment may be used to be mutually replaced with an open system module 100. Further, the mainframe system module 400 of the present specification may be used as a meaning including both the mainframe virtual machine 400 and the mainframe program 500 implemented on the mainframe virtual machine 400.

The native program (hereinafter, referred to as open system module) 100 may include predetermined program modules implemented in an open system environment (for example, Unix, Linux, etc.,) and perform functions of the mainframe system implemented through rehosting or perform functions of the open computing environment which is generally used. The native program 100 may be driven on the operating system 10 and the operating system 10 may include predetermined operating systems of the open system environment.

The mainframe program 500 is driven on the mainframe virtual machine 400 to be called in the open system module 100. The mainframe system as an industrial term referring to a large-sized computer manufactured in a large company such as IBM is primarily used in a computing business required for enterprise activities of companies such as major companies or financial institutions and is configured by a centralization scheme rather than a distributed computing scheme. The mainframe program 500 may be prepared by programming languages including Cobol, etc., and is different from the open system module 100 in terms of a driving scheme and may be implemented on the mainframe virtual machine 400. According to the exemplary embodiment of the present disclosure, the mainframe system module 400 may call the open system module 100 or be called by the open system module 100.

The front-end interface 200 may support data exchange, function transfer, and parameter transfer, etc., between the open system module 100 and the back-end interface 300. According to the exemplary embodiment of the present disclosure, the front-end interface 200 may enable communication between the open system module 100 and the back-end interface 300. According to the exemplary embodiment of the present disclosure, the front-end interface 200 may include an entrance point processing unit 210, a parameter processing unit 230, and a storage area processing unit 250. The front-end interface 200 may communicate with the back-end interface 300 by receiving a call from the open system module 100 so that the open system module 100 calls the mainframe system module 400. Further, the front-end interface 200 may communicate with the open system module 100 by receiving the call from the back-end interface 300 so that the mainframe system module 400 calls the open system module 100.

The back-end interface 300 may support data exchange, function transfer, and parameter transfer between the mainframe system module 400 and the front-end interface 200. According to the exemplary embodiment of the present disclosure, the back-end interface 300 may enable the communication between the mainframe system module 400 and the front-end interface 200. According to the exemplary embodiment of the present disclosure, the back-end interface 300 may include a program processing unit 370, a register processing unit 330, a memory processing unit 350, and a control transfer processing unit 370. The back-end interface 300 may communicate with the mainframe system module 400 by receiving the call from the front-end interface 200 so that the open system module 100 calls the mainframe system module 400. Further, the back-end interface 300 may communicate with the front-end interface 200 by receiving the call from the mainframe system module 400 so that the mainframe system module 400 calls the open system module 100.

According to the exemplary embodiment of the present disclosure, the open system module 100 and the mainframe system module 400 may communicate with each other and may call a function with each other, transfer a parameter for the called function, or exchange data. Therefore, even when the mainframe system is rehosted and constructed in the open system environment, a user in the open system environment may conveniently drive the functions of the mainframe system in the mainframe system environment as necessary. Further, calling the open frame system is supported in the mainframe system to extend the function of the mainframe system. According to the exemplary embodiment of the present disclosure, an interface is provided between the mainframe program which operates on the mainframe virtual machine and the native program (open system module) to support a mutual call without modifying the mainframe program and the native program.

Figure 2:
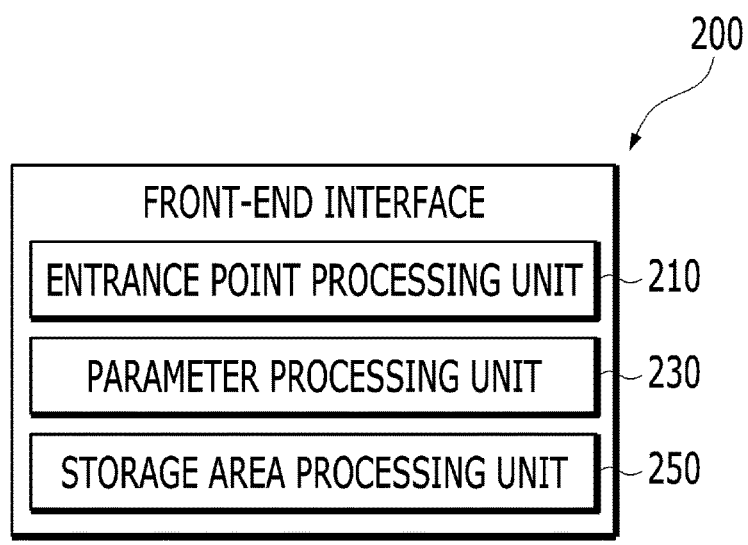
FIG. 2 is a block diagram illustrating a configuration of a front-end interface according to an exemplary embodiment of the present disclosure.

FIG. 2 is a block diagram illustrating a configuration of a front-end interface according to an exemplary embodiment of the present disclosure.

According to the exemplary embodiment of the present disclosure, the front-end interface 200 may include an entrance point processing unit 210, a parameter processing unit 230, and a storage area processing unit 250.

The entrance point processing unit 210 may perform a series of operations associated with a bi-directional function calling between the open system module 100 and the mainframe system module 400 according to the exemplary embodiment of the present disclosure.

The parameter processing unit 230 may perform a series of operations associated with bi-directional parameter transfer between the open system module 100 and the mainframe system module 9 according to the exemplary embodiment of the present disclosure.

The storage area processing unit 250 may perform a series of interfacing operations so as to satisfy a protocol associated with data storage of the mainframe system module 400 according to the exemplary embodiment of the present disclosure.

Figure 4:
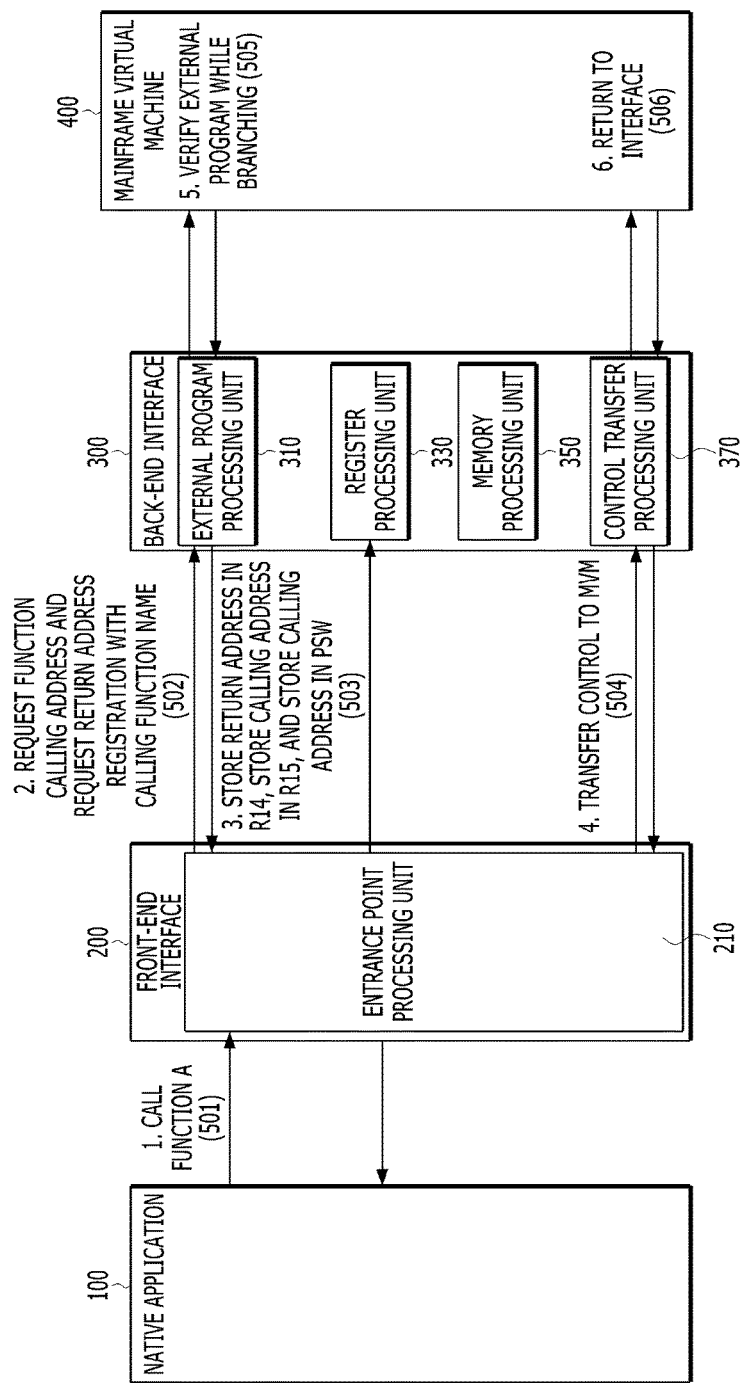
FIG. 4 is a schematic view illustrating a method for calling a mainframe virtual machine according to an exemplary embodiment of the present disclosure.

In the exemplary embodiment of the present disclosure of calling the mainframe system module 400 in the open system module 100, which is illustrated in FIG. 4, the open system module 100 may call the function, etc., which exist in the mainframe system module 400 through the front-end interface 200.

The front-end interface may receive the call for a mainframe function on the mainframe system module from the open system module program (501). In this case, the entrance point processing unit 210 may provide an entrance point to the program of the mainframe system module 400.

The front-end interface 200 which receives the call from the open system module 100 may request information on the mainframe function to the program processing unit of the back-end interface through the entrance point processing unit 210 (502). The information on the mainframe function may include a call address on the mainframe system module 400 of a name of the called function. The entrance point processing unit 210 may bring a function call address in the mainframe system module 400 with the called function name by calling the program processing unit 370 of the back-end interface 300. Further, the entrance point processing unit 210 may receive a return address registration request from the program processing unit 370 of the back-end interface 300 (502).

The entrance point processing unit 210 of the front-end interface 200 may control the register processing unit 330 of the back-end interface 300 to set a mainframe register value used in the mainframe system module (503). The mainframe register value may include at least one of a return register value indicating a time when the mainframe function needs to return to the open system module after being executed in the mainframe system module, a called function register value indicating an address of the called mainframe function, and a program counter register value indicating the address of the mainframe function which is currently executed. The entrance point processing unit 210 may receive an address registration request and call the register processing unit 330 of the back-end interface 300 to allow the register processing unit 330 to set the return address in a register and set a function call address in order to comply with a call protocol of the mainframe system module 400. The register processing unit 330 may set the return address in a register 14 and set the function call address in a register 15.

The entrance point processing unit 210 of the front-end interface 200 may transfer a system control to the mainframe system module 400 through the control transfer processing unit 370 of the back-end interface 300 so as to drive the mainframe function on the mainframe system module 400 (504). The mainframe system module 400 may perform a command based on a value of psw. A psw register which exists in the mainframe system module may store the address of a program which is currently executed.

The mainframe function called by the open system module 100 may be driven on the mainframe virtual machine (505). When driving the mainframe function is completed and the return address is verified, the mainframe system module 400 may allow the system control to return to the open system module. The mainframe function called by the open system module 100 may allow the system control to return to the open system module 100 when a program counter register value is the same as a return register value (506). In more detail, the mainframe system module 400 may determine that the system control returns to the open system module 100 when an address value corresponding to the return address defined by an external program (the program of the open system) coincides with the psw value while driving.

A process in which the system control returns from the mainframe system module 400 to the open system module 100 may be performed by the back-end interface 300's referring to the return address set in the program processing unit 370 of the back-end interface 300 in the entrance point processing unit 210 of the front-end interface 200.

When the program driven by the open system module 100 drives a command or code to call the mainframe function while driving, the mainframe function may be called through each unit of the front-end interface 200 and the back-end interface 300. The called mainframe function is driven on the mainframe system module 400 and when the driving is completed, the system control may return to the open system module 100 again. Therefore, according to the exemplary embodiment of the present disclosure, the open system module 100 may call the mainframe function on the mainframe system module 400.

When the mainframe system module 400 calls the open system module 100, the entrance point processing unit 210 of the front-end interface 200 may take over the system control from the back-end interface 300 and transfer the system control to the open system module 100. The entrance point processing unit 210 may exist to correspond to each open system module function.

Figure 8:
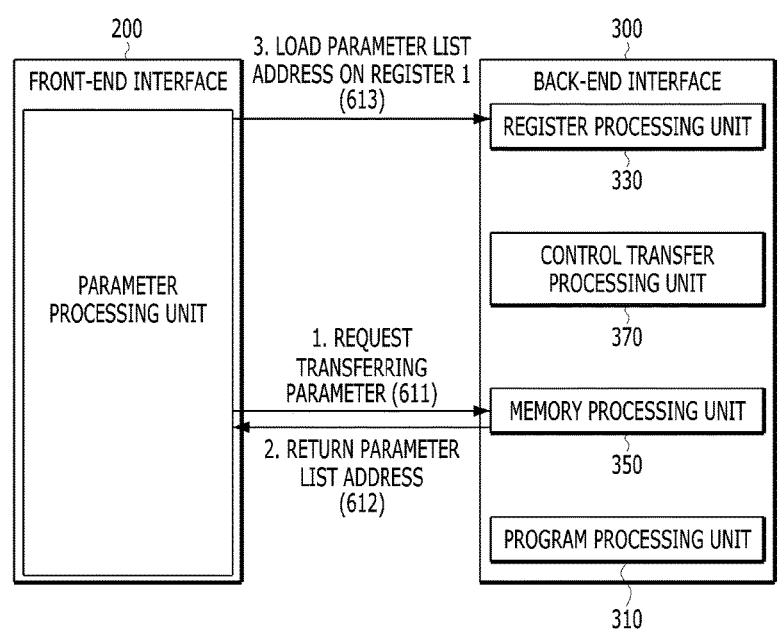
FIG. 8 is a schematic view illustrating a process of transferring the parameter of the main frame virtual machine to the negative program according to an exemplary embodiment of the present disclosure.

In the exemplary embodiment of the present disclosure of transferring the parameter from the open system module 100 to the mainframe system module 400, which is illustrated in FIG. 8, the open system module 100 may transfer the parameter to the mainframe system module 400 through the parameter processing unit 230 of the front-end interface 200.

Figure 6:
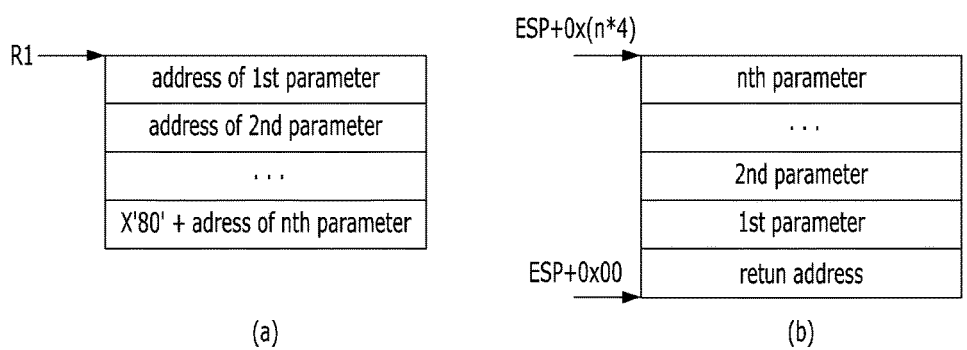
FIG. 6 is a schematic view illustrating parameter configurations of a mainframe environment and an open system environment according to an exemplary embodiment of the present disclosure.

FIG. 6A is a diagram illustrating a call parameter format of the mainframe system and FIG. 6B is a diagram illustrating the call parameter format in the open system environment. In a call parameter of the mainframe system, addresses of respective parameters are stored in a consecutive memory called a parameter list and the address of the corresponding parameter list is stored in an R1 register. On the contrary, the call parameters of the open system environment may be stacked in a stack in an order in which the respective parameters are defined in a proto type and transferred in a scheme illustrated in FIG. 6B. The call parameters of the mainframe system module and the open frame system module have different formats and there is a problem in that it is difficult to transfer and refer to an accurate parameter when the mainframe system module and the open frame system module mutually call the parameters. However, according to the exemplary embodiment of the present disclosure, the parameter processing unit 230 of the front-end interface 200 may reconfigure the parameters when mutually calling the parameters in order to make up a difference in parameter format.

The parameter processing unit 230 may receive an open system parameter from the open system module 100. The parameter processing unit 230 that receives the open system parameter may request the memory processing unit 350 of the back-end interface 300 to transfer the parameter (611).

The parameter processing unit 230 may transfer information on the open system parameter to the memory processing unit 350 of the back-end interface 300. The information on the open system parameter may include the number of open system parameters and the addresses of the respective open system parameters.

The memory processing unit 350 of the back-end interface 300 may change the open system parameter to a mainframe parameter by referring to the information on the open system parameter. The memory processing unit 350 that acquires the address of the parameter may generate the parameter list storing the address of each open system parameter and store the address of the parameter of the open system module in the parameter list, in order to follow the parameter call protocol of the mainframe system module. The memory processing unit 350 may set a value indicating that the parameter is a last parameter in the address of the last parameter among the parameters included in the parameter list. The memory processing unit 350 may return information on the mainframe parameter to the parameter processing unit 230 (612). The information on the mainframe parameter may include information on the open system parameter changed to the mainframe parameter and include information on the parameter list, a parameter value, a start parameter, and a last parameter.

The parameter processing unit 230 may transfer the information on the mainframe parameter to the register processing unit of the back-end interface so as to store the information on the mainframe parameter in the register (613).

When the parameter processing unit 230 of the open system module 100 transfers the parameter from the open system module 100 to the mainframe system module 400, the parameter processing unit 230 may change the format of the parameter through the back-end interface 300 so that the parameters on the open system meet the parameter protocol on the mainframe. Therefore, the mainframe system module 400 may be driven by receiving the open system parameter changed to the mainframe parameter format.

Figure 7:
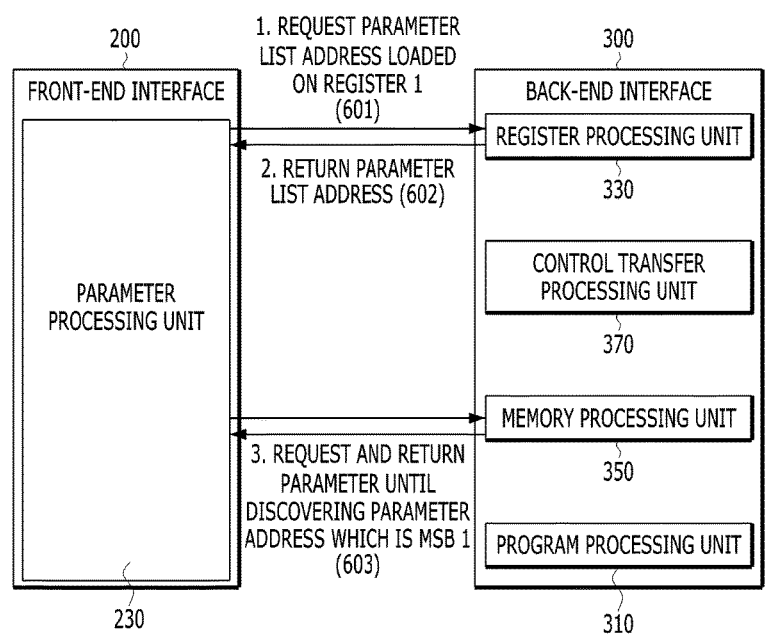
FIG. 7 is a schematic view illustrating a process of transferring a parameter of the native program to a mainframe virtual machine according to an exemplary embodiment of the present disclosure.

As illustrated in FIG. 7, when the parameter is transferred from the mainframe system module 400 to the open system module 200, the parameter processing unit 230 may request the address of the parameter list to the register processing unit 330 of the back-end interface 300 (601).

The parameter processing unit 230 may acquire the address of the parameter list loaded on the register from the register processing unit 330 of the back-end interface 300 (602). The address of the parameter list may be an address indicating the start address of the parameter on the system memory. The parameter processing unit 230 may sequentially acquire the parameters of the parameter list from the memory processing unit 350 of the back-end interface 300 by referring to the address of the parameter list (603). The parameter processing unit 230 may sequentially acquire the parameters of the parameter list until discovering a value indicating that the parameter is the last parameter among the parameters of the parameter list.

Figure 9:
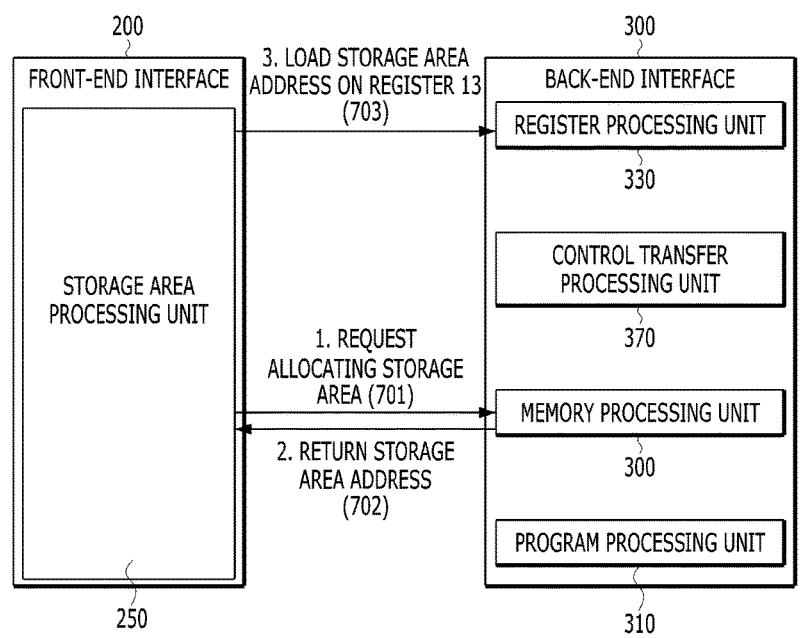
FIG. 9 is a schematic view illustrating an operation of a storage area processing unit according to an exemplary embodiment of the present disclosure.

As illustrated in FIG. 9, the storage area processing unit 250 may perform interfacing so as to satisfy the protocol associated with the data storage of the mainframe system module 400. The program of the mainframe system module 400 has a protocol to load in the register the address of a memory space (for example, 72 bytes) having a predetermined size, which is called a storage area at the time of calling the program and transfer the loaded address to the called program. The called program which is allocated with the storage area may store register values in the storage area in order to preserve register information of a caller and restore the register at the time of returning the program. However, such a protocol does not exist in the open system environment, and as a result, a problem may occur at the time of calling the program on the mainframe system module 400. Therefore, when the open system module 100 calls the mainframe system module 400, the storage area processing unit 250 may perform an operation of allocating a memory area having a predetermined space onto the mainframe system module 400 before the control is transferred to the mainframe system module 400 and storing the address for the memory area in the register. To this end, the storage area processing unit 250 of the front-end interface 200 may request the memory processing unit 350 of the back-end interface 300 to allocate the storage area (701). The memory processing unit 350 may return the address of the storage area to the storage area processing unit 250 (702). The storage area processing unit 250 acquires the address of the storage area from the memory processing unit 350 to allow the register processing unit 330 of the back-end interface 300 to load the address of the storage area in the register, and as a result, the mainframe system module may use the storage area (703).

Figure 3:
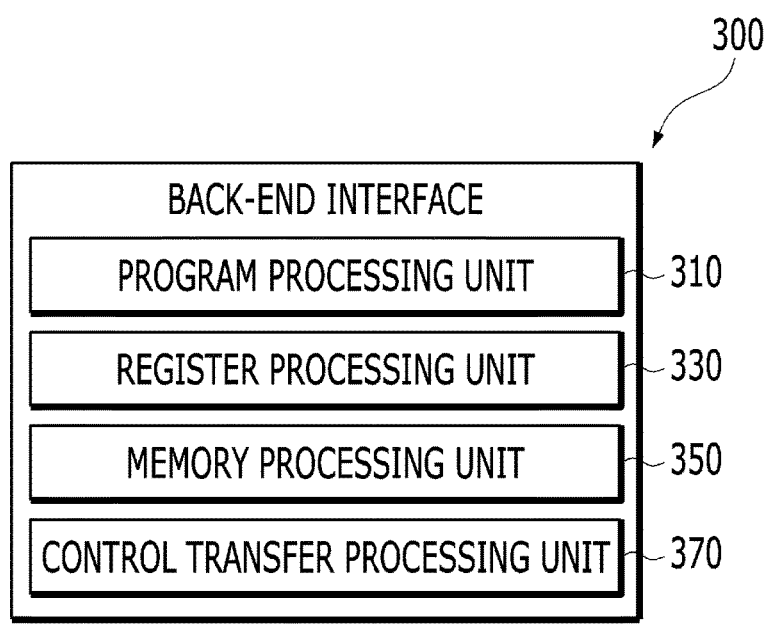
FIG. 3 is a block diagram illustrating a configuration of a back-end interface according to an exemplary embodiment of the present disclosure.

FIG. 3 is a block diagram illustrating a configuration of a back-end interface according to an exemplary embodiment of the present disclosure.

According to the exemplary embodiment of the present disclosure, the back-end interface 300 may include a program processing unit 370, a register processing unit 330, a memory processing unit 350, and a control transfer processing unit 370.

The program processing unit 370 may store and manage information on a mainframe function and an open system function and store and manage information on driving and thereafter, returning the respective functions. The program processing unit 370 may communicate with the front-end interface 200 and the mainframe system module 400 in order to support bi-directional function calling between the mainframe system module 400 and the open system module 100. The program processing unit 370 may provide the information on the mainframe function to the entrance point processing unit of the front-end interface and return the name of the open system module function to the mainframe system module so that the mainframe system module calls the open system module function.

The register processing unit 330 may set the value in the register or provide the values of the register to other components. The register processing unit 330 may provide the stored address of the parameter list to the parameter processing unit of the front-end interface and store the information on the mainframe parameter in the register.

The memory processing unit 350 may change the open system parameter to the mainframe parameter by referring to the information on the open system parameter and return the information on the mainframe parameter to the parameter processing unit 230. The memory processing unit 350 may generate the parameter list capable of loading the parameters and sequentially load the addresses for the corresponding parameters in the parameter list.

The control transfer processing unit 370 may bi-directionally transfer the system control between the mainframe system module 400 and the open system module 100.

Figure 5:
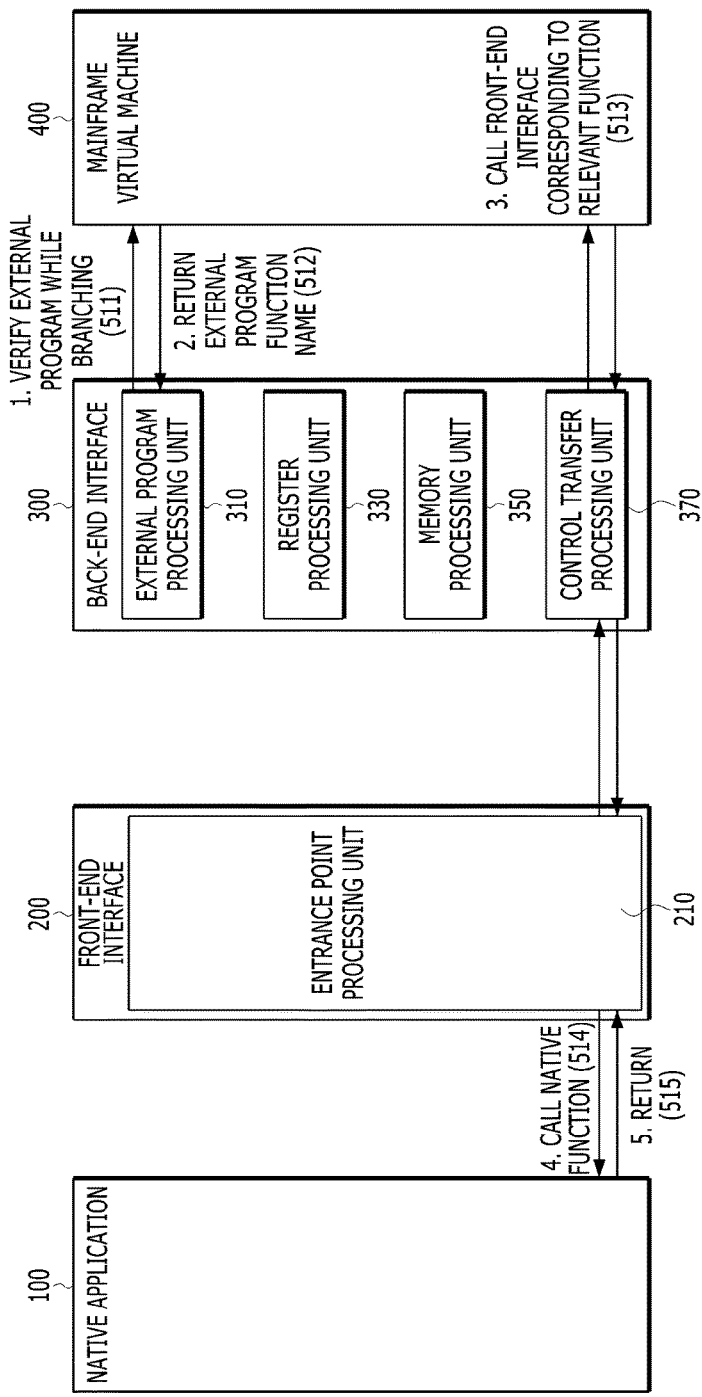
FIG. 5 is a schematic view illustrating a method for calling a native program according to an exemplary embodiment of the present disclosure.

In the exemplary embodiment of the present disclosure of calling the open system module 100 in the mainframe system module 400, which is illustrated in FIG. 5, the mainframe system module 400 may call the function, etc., which exist in the open system module 100 through the back-end interface 300.

The back-end interface may receive the call for the open system function on the open system module 100 from the mainframe system module 400. The mainframe system module 400 may request the information on the open system function to the program processing unit 370 of the back-end interface 300 (511). In this case, the program processing unit 370 of the back-end interface 300 may provide the name of the open system function to the mainframe system module 400 (512). The program processing unit 370 may map and manage the address and the name of the open system function. When the program processing unit 370 verifies that the mainframe system module 400 calls the open system module 100, the program processing unit 370 may return the registered name of the open system function to the mainframe system module 400.

The mainframe system module 400 may allow the control transfer processing unit 370 of the back-end interface 300 to call the entrance point processing unit 210 of the front-end interface 200 corresponding to the name of the open system function (513). The control transfer processing unit 370 calls the entrance point processing unit 210 corresponding to the name of the open system function to allow the entrance point processing unit 210 to call the open system function (514). The called open system function is driven on the open system module 100 and when the driving is completed, the system control may return to the mainframe system module 400 (514).

Figure 10:
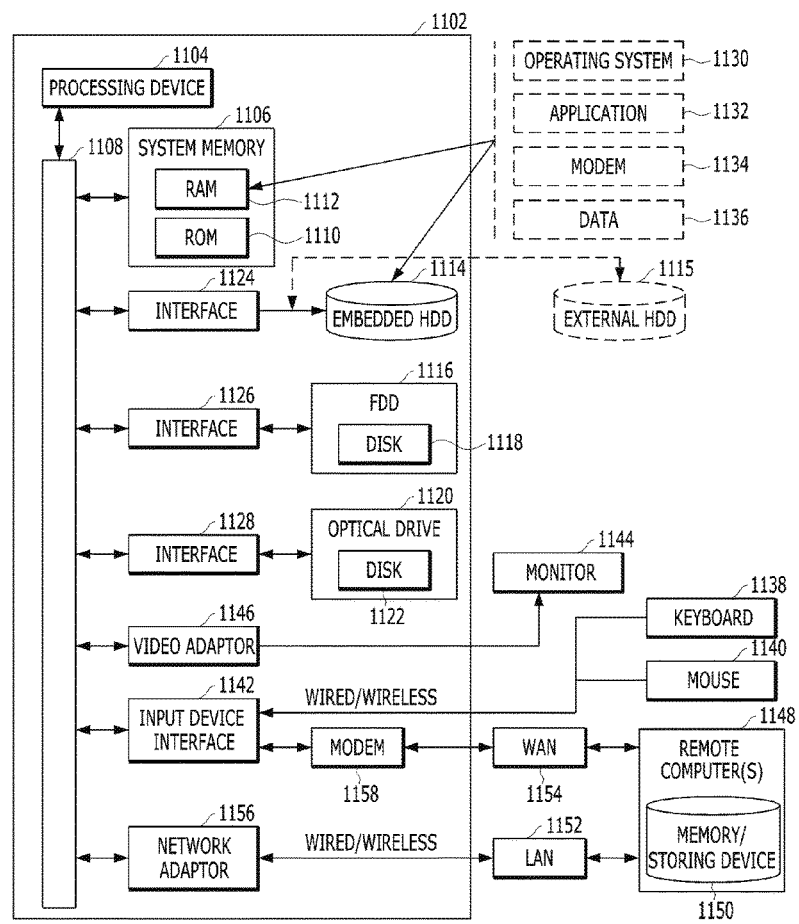
FIG. 10 illustrates a simple and general schematic view of an exemplary computing environment in which the exemplary embodiments of the present disclosure may be implemented.

FIG. 10 illustrates a simple and general schematic view of an exemplary computing environment in which the exemplary embodiments of the present disclosure may be implemented.

The present disclosure has generally been described above in association with a computer executable command which may be executed on one or more computers, but it will be well appreciated by those skilled in the art that the present disclosure can be implemented through a combination with other program modules and/or a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As not a limit but an example, the computer readable media may include computer storage media and communication media. The computer storage media include volatile and non-volatile, temporary or non-temporary, and movable and non-movable media implemented by a predetermined method or technology for storing information such as a computer readable command, a data structure, a program module, or other data. The computer storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The communication media generally implement the computer readable command, the data structure, the program module, or other data in a carrier wave or a modulated data signal such as other transport mechanism and include all information transfer media. The term modulated data signal means a signal acquired by configuring or changing at least one of characteristics of the signal so as to encode information in the signal. As not a limit but an example, the communication media include wired media such as a wired network or a direct-wired connection and wireless media such as acoustic, RF, infrared and other wireless media. A combination of any media among the aforementioned media is also included in a range of the computer readable media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor or other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an embedded hard disk drive (HDD) 1114 (for example, EIDE and SATA)—the embedded hard disk drive (HDD) 1114 may also be configured for an exterior purpose in an appropriate chassis (not illustrated)—, a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD). The hard disk drive 1114, the magnetic disk drive 1116, and the optical disk drive 1120 may be connected to the system bus 1108 by a hard disk drive interface 1124, a magnetic disk drive interface 1126, and an optical drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable command, and others. In the case of the computer 1102, the drives and the media correspond to storing predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached by the RAM 1112. It will be well appreciated that the present disclosure may be implemented in various operating systems which are commercially usable or a combination of the operating systems.

A user may input commands and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. The devices and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes a speaker, a printer, and other peripheral output devices (not illustrated).

The computer 1102 may operate in a networked environment by using a logical connection to one or more remote computers including remote computer(s) 1148 through wired and/or wireless communication. The remote computer(s) 1148 may be a workstation, a computer device computer, a router, a personal computer, a portable computer, a microprocessor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and the like and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication in the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an embedded or exterior and wired or wireless device is connected to the system bus 1108 through the serial port interface 1142. In the networked environment, the program modules described with respect to the computer 1102 or some thereof may be stored in the remote memory/storage device 1150. The illustrated network connection is exemplary and it will be well appreciated that other means configuring a communication link among computers may be used.

The computer 1102 performs an operation of communicating with predetermined wireless devices or entities which are disposed and operated by the wireless communication, for example, the printer, a scanner, a desktop and/or portable computer, a portable data assistant (PDA), a communication satellite, predetermined equipment or place associated with a wireless detectable tag, and a telephone. This at least includes wireless fidelity (Wi-Fi) and a Bluetooth wireless technology. Accordingly, communication may be a predefined structure like the network in the related art or just ad hoc communication between at least two devices.

The Wi-Fi enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps(802.11a) or 54 Mbps(802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as "software"), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be analyzed that the implementation determination departs from the scope of the present disclosure.

Various exemplary embodiments presented herein may be implemented as manufactured articles using a method, an apparatus, or a standard programming and/or engineering technique. The term "manufactured article" includes a computer program, a carrier, or a medium which is accessible by a predetermined computer-readable device. For example, a computer-readable medium includes a computer-readable storage medium and a computer-readable transmission medium and the computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further the computer-readable transmission medium includes a wireless channel and various other media which are capable of transferring data and information, but is not limited thereto.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but it does not mean that the method claims are limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be analyzed within the widest range which is coherent with the principles and new features presented herein.

What is claimed is:

1. A method for bi-directional calling between an open system module and a mainframe system module, which is performed in a computing device including one or more processors and a main memory storing commands executable in the processors, the method comprising:
    receiving, by a front-end interface, a calling for a mainframe function on the mainframe system module from an open system module program;
    requesting, by an entrance point processing unit of the front-end interface, information on the mainframe function to a program processing unit of a back-end interface;
    controlling, by the entrance point processing unit of the front-end interface, a register processing unit of the back-end interface to set a mainframe register value used in the mainframe system module; and
    transferring, by the front-end interface, a system control to the mainframe system module through a control transfer processing unit of the back-end interface so as to drive the mainframe function on the mainframe system module.

2. The method of claim 1, further comprising:
    setting, by the entrance point processing unit of the front-end interface, a return address after calling the mainframe function in the program processing unit of the back-end interface.

3. The method of claim 1, wherein the mainframe register value includes
    a return register value indicating a time when the mainframe function is executed in the mainframe system module and thereafter, returns to the open system module,
    a calling function register value indicating an address of the called mainframe function, and
    a program counter register value indicating the address of the mainframe function which is currently executed.

4. The method of claim 3, further comprising:
    returning the system control from the mainframe system module to the open system module when the program counter register value is the same as the return register value.

5. The method of claim 4, wherein in the returning of the system control from the mainframe system module to the open system module, the back-end interface is performed by referring to a return address set in the program processing unit of the back-end interface in the entrance point processing unit of the front-end interface.

6. A method for bi-directional calling between an open system module and a mainframe system module, which is performed in a computing device including one or more processors and a main memory storing commands executable in the processors, the method comprising:
    receiving, by a back-end interface, a calling for an open system module function on the open system module from the mainframe system module;
    returning, by a program processing unit of the back-end interface, a name of the open system module function to the mainframe system module;

transferring, by the mainframe system module, a system control to the open system module through the back-end interface by allowing a control transfer processing unit of the back-end interface to call an entrance point processing unit of a front-end interface corresponding to the name of the open system module function; and calling, by the front-end interface, the open system module function.

7. The method of claim 6, wherein the back-end interface maps and stores the name and an address of the open system module function.

8. A method for bi-directional parameter transfer between an open system module and a mainframe system module, which is performed in a computing device including one or more processors and a main memory storing commands executable in the processors, the method comprising:

receiving, by a back-end interface, a calling for a mainframe parameter on the mainframe system module from the open system module;

acquiring, by a parameter processing unit of a front-end interface, the address of a parameter list stored in a register processing unit of the back-end interface from the register processing unit of the back-end interface; and sequentially acquiring, by the parameter processing unit, parameters of the parameter list from a memory processing unit of the back-end interface by referring to the address of the parameter list.

9. The method of claim 8, wherein the address of the parameter list indicates a start address of the parameter on the memory.

10. The method of claim 8, wherein the sequentially acquiring of the parameters of the parameter list is performed until the parameter processing unit discovers a value indicating that the parameter is a last parameter among the parameters of the parameter list.

11. The method of claim 8, wherein the value indicating that the parameter is the last parameter is a parameter address value in which a most significant bit or a most significant byte is 1.

12. A method for bi-directional parameter transfer between an open system module and a mainframe system module, which is performed in a computing device including one or more processors and a main memory storing commands executable in the processors, the method comprising:

receiving, by a parameter processing unit of a front-end interface, an open system parameter from the open system module;

transferring, by the parameter processing unit, information on the open system parameter to a memory processing unit of a back-end interface;

changing, by the memory processing unit, the open system parameter to a mainframe parameter by referring to the information on the open system parameter;

returning, by the memory processing unit, the information on the mainframe parameter to the parameter processing unit; and transferring, by the parameter processing unit, the information on the mainframe parameter to a register processing unit of the back-end interface so as to store the information on the mainframe parameter in a register.

13. The method of claim 12, wherein the information on the open system parameter includes the number of open system parameters and addresses of the respective open system parameters.

14. The method of claim 12, wherein the changing of the open system parameter to the mainframe parameter includes generating a parameter list storing the addresses of the respective open system parameters and storing the address of the parameter of the open system module in the parameter list in order to follow a parameter call protocol of the mainframe system module.

15. The method of claim 14, further comprising:

setting, by the memory processing unit, a value indicating that the parameter is a last parameter in the address of a last parameter among the parameters included in the parameter list.

* * * * *